(12) United States Patent
Raynor

(10) Patent No.: US 12,439,164 B2
(45) Date of Patent: Oct. 7, 2025

(54) ASYNCHRONOUS INTEGRATION IN ROLLING SHUTTER IMAGE SENSORS

(71) Applicant: STMicroelectronics International N.V., Geneva (CH)

(72) Inventor: Jeffrey M. Raynor, Edinburgh (GB)

(73) Assignee: STMicroelectronics International N.V., Geneva (CH)

( * ) Notice: Subject to any disclaimer, the term of this patent is extended or adjusted under 35 U.S.C. 154(b) by 140 days.

(21) Appl. No.: 18/494,502

(22) Filed: Oct. 25, 2023

(65) Prior Publication Data

US 2025/0142225 A1    May 1, 2025

(51) Int. Cl.
| | |
|---|---|
| H04N 23/71 | (2023.01) |
| H04N 23/73 | (2023.01) |
| H04N 23/745 | (2023.01) |
| H04N 23/76 | (2023.01) |
| H04N 23/81 | (2023.01) |
| H04N 25/53 | (2023.01) |
| H04N 25/531 | (2023.01) |
| H04N 25/533 | (2023.01) |
| H04N 25/57 | (2023.01) |
| H04N 25/78 | (2023.01) |

(52) U.S. Cl.
CPC ............ *H04N 23/71* (2023.01); *H04N 23/73* (2023.01); *H04N 23/745* (2023.01); *H04N 23/76* (2023.01); *H04N 23/81* (2023.01); *H04N 25/53* (2023.01); *H04N 25/531* (2023.01); *H04N 25/533* (2023.01); *H04N 25/57* (2023.01); *H04N 25/78* (2023.01)

(58) Field of Classification Search
CPC ...... H04N 23/71; H04N 23/73; H04N 23/745; H04N 23/76; H04N 23/81; H04N 25/53; H04N 25/531; H04N 25/533; H04N 25/57; H04N 25/78
See application file for complete search history.

(56) References Cited

U.S. PATENT DOCUMENTS

| | | | |
|---|---|---|---|
| 8,451,356 B2 * | 5/2013 | Martinez ................ | H04N 25/76 348/248 |
| 2010/0026838 A1 | 2/2010 | Belenky et al. | |
| 2010/0329657 A1 | 12/2010 | Hosoi et al. | |
| 2013/0208149 A1 * | 8/2013 | Kamiya ................ | H04N 23/81 348/241 |
| 2014/0027606 A1 | 1/2014 | Raynor et al. | |

(Continued)

*Primary Examiner* — Lin Ye
*Assistant Examiner* — Chriss S Yoder, III
(74) *Attorney, Agent, or Firm* — Slater Matsil, LLP

(57) ABSTRACT

According to an embodiment, a method for capturing an image frame using a pixel array of an image sensor is provided. The method includes sequentially resetting each pixel row of the pixel array; sequentially reading out each pixel row of a first subset of pixel rows during a readout phase such that an integration time for each pixel of the first subset of pixel rows is equal to a fixed integration time; and globally resetting pixels of the pixel array in response to detecting that an ambient light level exceeds a threshold level, the globally resetting of the pixels occurring before a reading out of a second subset of pixel rows, each pixel row in the second subset of pixel rows having a variable integration time less than the fixed integration time and starting from the globally resetting of the pixels.

20 Claims, 5 Drawing Sheets

(56) References Cited

U.S. PATENT DOCUMENTS

2015/0181139 A1* 6/2015 Kerbiriou .............. H04N 23/73
  348/297
2017/0366719 A1* 12/2017 Kubota ................. H04N 23/76
2020/0267385 A1 8/2020 Lim et al.

* cited by examiner

ASYNCHRONOUS INTEGRATION IN ROLLING SHUTTER IMAGE SENSORS

TECHNICAL FIELD

The present disclosure generally relates to image sensors and, in particular embodiments, to a high dynamic range rolling shutter image sensor using asynchronous integration.

BACKGROUND

Often, still and video cameras (e.g., digital cameras equipped with complementary metal-oxide semiconductor (CMOS) sensors) employ a mechanism referred to as a rolling shutter for capturing imagery. Contrary to capturing the entire scene in a unified moment, the rolling shutter acquires the image sequentially, scanning it row by row. This procedural scan is not limited to still photography but is inherent in video cameras, affecting the individual frames composing the video footage.

Under unique conditions, there can be a pronounced and abrupt surge in illumination, often during the sensor's readout phase. This sudden burst of intense light can overload rows of pixels during the readout phase in a frame, leading to a saturation of the output of the pixels. The resulting image typically exhibits overexposure or saturation in the areas affected by the burst of light. This overexposure often manifests as "blown out" regions within the image where details are lost due to the overwhelming light intensity, and the affected pixels or rows of pixels are captured as white or very bright areas. In contrast, parts of the image that were read out before the burst of light will typically be correctly exposed and appear normal.

For example, in a scenario where one is capturing an image of a scene, and suddenly a flash of light occurs. If the camera utilizes a rolling shutter, the resulting image might show the object normally in one portion and overly bright or distorted in another, creating a distortion commonly referred to as the "rolling shutter effect." This can be particularly problematic in scientific or professional photography where accuracy and detail are paramount, but it can also impact general photography, impacting the aesthetic quality and realism of the captured images.

Likewise, when a camera, such as a security camera, utilizes a rolling shutter, the impact on the captured frame can compromise the quality and reliability of the recorded footage. This could potentially hinder the primary purpose of the security camera, which is to monitor and record clear and accurate visual information about the environment. For example, the areas affected by the sudden burst of light in the frame will likely be overexposed, causing a loss of detail in those regions. Important information or objects within those areas may become unrecognizable. A suitable solution to these challenges is desirable.

SUMMARY

Technical advantages are generally achieved by embodiments of this disclosure, which describe a high dynamic range rolling shutter image sensor using asynchronous integration.

A first aspect relates to a method for capturing an image frame using a pixel array of an image sensor. The method includes sequentially resetting each pixel row of the pixel array from a first pixel row to a last pixel row; sequentially reading out each pixel row of a first subset of pixel rows during a readout phase such that an integration time for each pixel of the first subset of pixel rows is equal to a fixed integration time; and globally resetting pixels of the pixel array in response to detecting that an ambient light level exceeds a threshold level, the globally resetting of the pixels occurring before a reading out of a second subset of pixel rows, each pixel row in the second subset of pixel rows having a variable integration time less than the fixed integration time and starting from the globally resetting of the pixels.

A second aspect relates to an imaging system. The imaging system includes a pixel array; a non-transitory memory storage comprising instructions; and a processor in communication with the non-transitory memory storage and the pixel array. The processor is configured to execute the instructions to sequentially reset each pixel row of the pixel array from a first pixel row to a last pixel row; sequentially read out each pixel row of a first subset of pixel rows during a readout phase such that an integration time for each pixel of the first subset of pixel rows is equal to a fixed integration time; and globally reset pixels of the pixel array in response to detecting that an ambient light level exceeds a threshold level, the globally resetting of the pixels occurring before a reading out of a second subset of pixel rows, each pixel row in the second subset of pixel rows having a variable integration time less than the fixed integration time and starting from the globally resetting of the pixels.

A third aspect relates to a computer-implemented method for capturing an image frame using a pixel array of an image sensor. The computer-implemented method includes sequentially resetting each pixel row of the pixel array from a first pixel row to a last pixel row; sequentially reading out each pixel row of a first subset of pixel rows during a readout phase such that an integration time for each pixel of the first subset of pixel rows is equal to a fixed integration time; and globally resetting pixels of the pixel array in response to detecting that an ambient light level exceeds a threshold level, the globally resetting of the pixels occurring before a reading out of a second subset of pixel rows, each pixel row in the second subset of pixel rows having a variable integration time less than the fixed integration time and starting from the globally resetting of the pixels.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of video cameras, it should also be appreciated that these inventive aspects may also apply to still cameras.

In embodiments, an imaging system and corresponding method for capturing an image frame using a pixel array of the image sensor is provided. The method includes sequentially resetting each pixel row of the pixel array from a first pixel row to a last pixel row; sequentially reading out each pixel row of a first subset of pixel rows during a readout phase such that an integration time for each pixel of the first subset of pixel rows is equal to a fixed integration time; and globally resetting pixels of the pixel array in response to detecting that an ambient light level exceeds a threshold level. The globally resetting of the pixels occur before a reading out of a second subset of pixel rows, and each pixel row in the second subset of pixel rows has a variable integration time less than the fixed integration time and starting from the globally resetting of the pixels.

Figure 1:
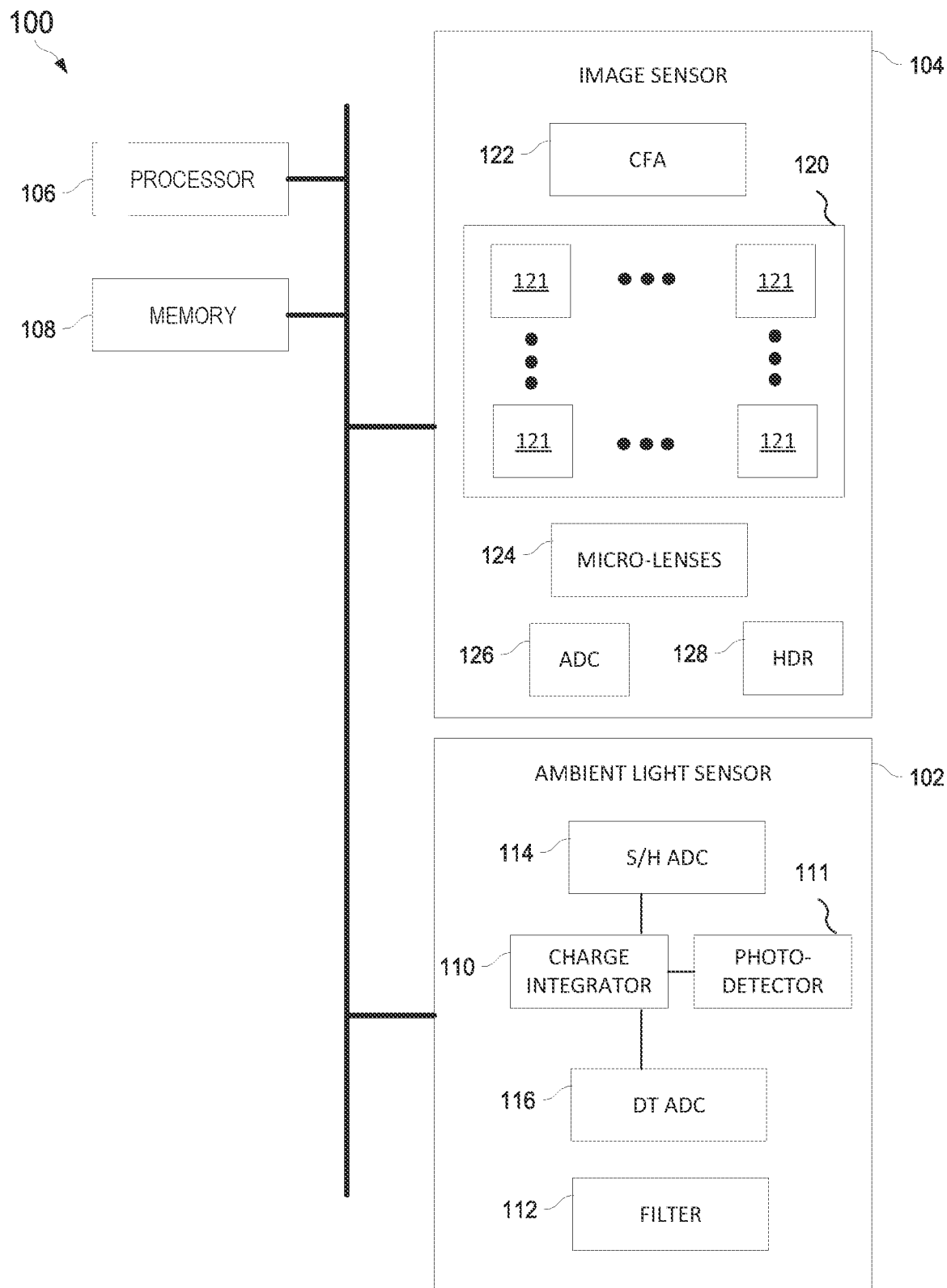
FIG. 1 is a block diagram of an embodiment imaging system.

FIG. 1 illustrates a block diagram of an embodiment imaging system 100. Imaging system 100 may be used to capture, process, and represent visual information, in the form of images or videos. Imaging system 100 may be used in various applications, such as photography, videography, security applications, and the like. Imaging system 100 may be included in a host device such as a digital camera, a digital video camera, a smartphone, a tablet, a laptop, 3D printer, or the like.

As shown, imaging system 100 includes an ambient light sensor (ALS) 102, an image sensor 104, an image processor 106, and a memory 108, which may (or may not) be arranged as shown. In embodiments, imaging system 100 is configured to capture and process images effectively, adapting to various light conditions to optimize the captured image data.

In embodiments, ambient light sensor 102 is configured to measure the intensity of the surrounding light. This information assists in adjusting the "white balance" of images, ensuring that the display is fine-tuned to render visuals with optimal appearance. Greater precision can be achieved by using a common centroid arrangement for various colors, thereby reducing any spatial sensitivities.

In embodiments, ambient light sensor 102 includes a charge integrator 110 and a photo-detector 111, such as a photodiode, phototransistor, or other light-sensitive element. The photo-detector 111 converts light energy to an electrical signal, which is fed to the charge integrator 110. The charge integrator 110, which includes, for example, an operational amplifier and a feedback capacitor), integrates the charge over time (e.g., fixed) to create a voltage. In embodiments, a trans-impedance amplifier (not shown), comprising, for example, an operational amplifier and a feedback resistor, provides a light-sensitive readout.

When light strikes the sensor, the light-sensitive elements of the charge integrator 110 generate a current or voltage proportional to the incident light's intensity. In embodiments, the charge integrator 110 includes an optical filter 112 to narrow down the sensitivity to the visible light spectrum. Optical filter 112 may include infrared filters to minimize the interference from infrared light, thus focusing predominantly on the visible light spectrum relevant for imaging applications.

In embodiments, ambient light sensor 102 includes one or more analog-to-digital converters (ADCs), such as the sample and hold (S/H) ADC 114 and the differentiating threshold ADC 116. In embodiments, the S/H ADC 114 converts the electrical signal representing the measured light levels from the charge integrator 110 into a digital output indicating the ambient light level in a digital format. S/H ADC 114 can capture or "sample," for example, the analog signal's voltage from the charge integrator 110 at a specific instant in time and then "hold" this voltage constant during the conversion process, which allows the analog signal to remain stable and not vary during the time it takes for the S/H ADC 114 to complete the conversion, allowing for a more accurate digital representation of the sampled signal.

In embodiments, differentiating threshold ADC 116 is configured to identify sudden changes or surges in photon levels, providing a specific value when such a surge is detected. Differentiating threshold ADC 116 receives the electrical signals from the charge integrator 110 and converts these analog signals into their corresponding digital values. Differentiating threshold ADC 116 takes this electrical signal and transmutes it into a digital format. Once the analog signal is converted into a digital value, this value is then compared against a predetermined threshold level. The threshold level is set to discern normal signal levels from those indicative of anomalous conditions, such as a surge in photons, which usually represents a sudden increase in light intensity. If the digital representation of the received electrical signal surpasses this threshold level, it is interpreted as the detection of a photon surge.

In embodiments, once the ambient light level is quantified, this information is relayed to the image processor 106. The imaging system 100, in response, makes dynamic adjustments to various parameters such as exposure time, brightness, contrast, and screen illumination to optimize image capture and display under the prevailing light conditions. For instance, in a camera, the ambient light sensor's readings might influence the shutter speed, aperture size, and ISO settings, enabling the capture of well-exposed images. In mobile devices and displays, this sensor aids in adjusting the screen brightness to ensure optimal visibility and reduce power consumption under different ambient lighting conditions.

In embodiments, image sensor 104 translates an optical image into an electronic signal. It serves as the electronic eye, capturing light and converting it into an electric charge, which is then transformed into an image file by, for example, the image processor 106. In embodiments, image sensor 104 is a Complementary Metal-Oxide-Semiconductor (CMOS) sensor.

In embodiments, image sensor 104 includes a plurality of pixels 121, each capable of detecting and measuring photons (light particles). In embodiments, the image sensor 104 includes a pixel array 120 composed of a grid of individual pixels 121. In embodiments, each pixel 121 of the pixel array 120 is a photodetector sensitive to light. In embodiments, the pixels 121 are arranged in rows and columns to cover the field of view of the image sensor 104. Each pixel 121 corresponds to a specific point in the final image and captures the light information. When light, composed of photons, reaches the pixel array 120, each pixel 121 absorbs the photons and converts them into an electric charge. The amount of generated charge in each pixel 121 is proportional to the intensity of the incoming light, allowing different brightness levels to be represented.

In embodiments, image sensor 104 includes a color filter array (CFA) 122, such as a Bayer filter to capture color information by filtering the light into red, green, and blue wavelengths before it reaches the pixels 121. In embodiments, an array of micro-lenses 124 is often placed above the pixels 121 to focus and direct more light toward each pixel 121, improving the sensor's efficiency and sensitivity. In embodiments, image sensor 104 includes an ADC 126 to translate charge from each pixel 121 from an analog signal to a digital value.

Traditional cameras like Digital Single-Lens Reflex (DSLR) and mirrorless interchangeable lens cameras (MILC) incorporate a mechanical shutter. In contrast, most contemporary cameras have moved away from this feature. These modern cameras usually employ an active pixel sensor, often a CMOS Image Sensor, which maintains the pixel in a reset condition until it's the appropriate moment to begin integration. While in this reset state, the pixel still generates a charge due to exposure to light; however, this charge is typically directed either to the power supply or occasionally grounded.

When the camera's shutter opens, the pixel array 120 of the image sensor 104 is exposed to light, and each pixel 121 of the pixel array 120 absorbs photons, generating an electrical charge proportional to the light's intensity. After the exposure, the readout mechanism of the image sensor 104 transfers the charge from each pixel 121 to the ADC 126, translating the analog signal into digital values. These values represent the brightness levels of each pixel 121 in the final image.

In embodiments, image sensor 104 includes a high dynamic range (HDR), surge suppression circuit 128, configured to receive a signal from the differentiating threshold ADC 116 indicating a photon surge detection. HDR, surge suppression circuit 128 can manage high dynamic range and suppress any aberrations caused by sudden light surges, ensuring the integrity of the captured image data.

The final step in the operation of the image sensor 104 is the processing of the digital values by an image processor 106, which applies corrections, enhancements, and compression to the raw data to produce the final image. This processed image is stored in the memory 108. Image processor 106 may be any component or collection of components adapted to perform computations or other processing-related tasks. In embodiments, image processor 106 is an application processor or a microcontroller of the host device of imaging system 100. In embodiments, image processor 106 is a signal processing unit. In embodiments, the image processor 106 is configured to execute instructions to operate the image sensor 104 based on the disclosure herein.

Memory 108 may be any component or collection of components adapted to store programming or instructions for execution by image processor 106. In an embodiment, memory 108 includes a non-transitory computer-readable medium. In embodiments, image processor 106 and memory 108 are configured to handle and store the digital information. In embodiments, image processor 106 manages the operations and computations required for capturing, processing, and potentially enhancing the image data. In embodiments, memory 108 serves as a repository to store this processed image data, whether temporarily or permanently, facilitating retrieval and further usage or modifications of the images.

After the readout phase, the digital values from the pixel array 120 are used to reconstruct the captured image. The digital representation of each pixel's light intensity and color is organized in a two-dimensional array corresponding to the layout of the pixel array 120 on the image sensor 104. The pixel array 120 values form the digital image that can be processed, displayed, stored, or transmitted by the imaging system 100.

Imaging system 100 may include additional components not shown. For example, imaging system 100 can include a user interface, allowing users to interact with and manage the system's settings, view the captured images, and possibly adjust the camera's parameters. An external flash unit could be incorporated to provide additional lighting when the ambient light is inadequate. Further, implementing advanced software algorithms could enable features like image stabilization, face recognition, and auto-focus, significantly improving the versatility and efficiency of the imaging system. A wireless communication module can also be added to enable the sharing of the captured images or to connect the camera system to other devices or networks for additional functionalities. A power source, typically a rechargeable battery, a solar cell, or the like, can power the system. External ports for charging, data transfer, and connection to other devices, an image stabilization system, a thermal management system to regulate heat production, a focus mechanism, a filter wheel or color filter array for color images or specific spectral bands, and an enclosure to protect the internal components can all be incorporated to augment the imaging system 100 capabilities and performance.

Generally, to capture an image, a pixel 121 goes through three distinct operational phases. The first phase involves resetting the pixel 121 and preparing it to receive new light information. Following the reset, pixel 121 enters the second phase where it is exposed to light, absorbing photons and converting them to an electrical charge proportional to the light intensity. The third and final phase is the readout stage. In this phase, the voltage, corresponding to the accumulated charge from the absorbed photons, is measured, allowing the conversion of the received light information into a digital value that can be further processed to form an image. Typically, each pixel 121 is converted into the digital domain before being transmitted off the chip. In video cameras, these phases are repeated continuously.

An image sensor, such as the image sensor 104, utilizing the rolling shutter principle, operates by sequentially capturing images row by row, as opposed to acquiring the entire frame at once, which is a characteristic of global shutter sensors. In this methodology, each pixel 121 in the pixel array 120 corresponds to a distinct light point in the image, and every pixel row is sequentially exposed to light, one after the other.

Figure 2:
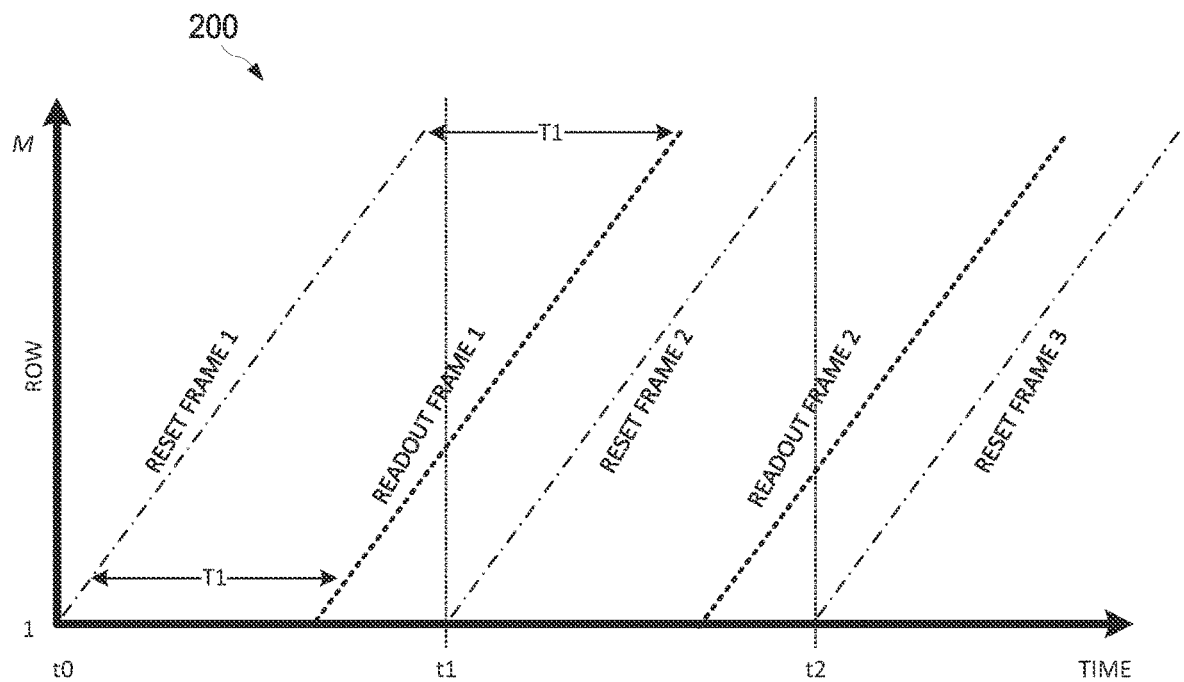
FIG. 2 is a timing diagram of an operation of an imaging system incorporating a rolling shutter.

FIG. 2 illustrates a timing diagram 200 of an operation of an imaging system 100 incorporating a rolling shutter. Pixel array 120 may be arranged as an M×N array of pixels 121, where M and N are integers greater than zero, M representing the number of rows and N representing the number of columns. The vertical axis represents the different rows of the pixel array 120 from 1 to M. As shown, FIG. 2 illustrates the progression of the three distinct operational phases for each pixel 121 in a specific column (i.e., N number of pixels 121) for each of the M number of rows.

Initially, the operation begins with the reset phase for frame 1 at time t0, where each of the N number of the first pixel row is reset to initiate the exposure or light collection process for that specific row, while the other rows of pixels (i.e., M−1 number of rows of pixels) remain inactive. During the exposure phase (between time t0 and t1), each pixel 121 (i.e., N number of pixels 121) in the activated row gathers photons and transforms them into an electrical charge corresponding to the intensity of the received light. After a set duration (T1), the exposure phase for this row concludes, and the accumulated charge is retained, ready to be read out at time t1. Following the exposure, the readout phase begins at time t1, wherein the stored charges in pixels 121 of the completed row are measured and converted into digital values, depicting the varying light intensities. These digital values are then processed further to reconstruct and form the image.

Subsequently, the same process is applied to the next row, which continues sequentially until each row in the pixel array 120 has been exposed and read, completing the capture of the whole image frame. The time elapsed between a row's reset and its readout is referred to as the integration time (T1), and adjustments can be made by varying the time between the reset traversing a row and the subsequent readout of that row.

When utilizing the image sensor 104 with the rolling shutter principle to capture video, the mechanism involves the systematic and consistent capture of individual frames to render a sequence of moving images or video. Here, each frame acts as a still image, and when these frames are played back in rapid succession, they produce what we perceive as motion or video.

The frame rate of a video quantified as frames per second (fps), signifies the number of individual frames captured every second. This rate can be standard, such as 24, 30, or 60 fps, or even higher for specific requirements like slow-motion capture. The rolling shutter continually operates to capture individual frames at this predetermined rate, sequentially processing each pixel row for every frame.

Within each frame, (t0 to t1, t1 to t2, etc.) the rolling shutter executes the process for each pixel row sequentially. This implies that each row within a frame is exposed and read out at slightly different times, representing different moments within the overall duration of that frame. This operation of resetting, exposing, and reading the pixels is a continuous one, occurring for every frame in the sequence, and is synchronized with the recording speed to enable smooth and coherent playback of the video. For example, in a video with a frame rate of 50 fps, this sequence of operations is reiterated 50 times every second, ensuring the capture of adequate frames to create the illusion of seamless motion in the resultant video.

Once a frame is captured, the resultant digital values are subjected to processing and compression by the camera's internal mechanisms and stored or transmitted as cohesive video data. Additionally, sophisticated processing techniques might be applied during real-time capture or in post-processing to mitigate distortions, enhance the overall quality and color balance of the image, and stabilize the video, among other enhancements.

In a rolling shutter system, adjusting integration time in response to varying light levels allows optimal image exposure. Integration time is the duration during which pixels 121 on the image sensor 104 are exposed to light, accumulating photons to be converted into an electrical charge, which is subsequently transformed into a digital value representing light intensity.

Generally, the ambient light sensor 102 continuously measures the surrounding light conditions, interpreting whether the scene is well-lit, underlit, or over-lit. Accurately adjusting the integration time aids the image sensor 104 in adapting to diverse lighting conditions. When the ambient light is low, the image sensor 104 requires a longer integration time, allowing more time for the pixels 121 to collect photons and thereby enhancing the sensor's sensitivity to light. Conversely, in conditions of high ambient light, the integration time is shortened to avoid overexposure by reducing the amount of light that each pixel 121 accumulates.

The adjustment of integration time is also inherently tied to the frame rate of the video being captured. The max integration time for each frame is set to frame rate 1/frame rate. For example, if the frame rate is 50 fps, the maximum integration time is $\frac{1}{50}$=20 ms. In this example, thus, the integration time is set not to exceed 20 ms. The integration time for each pixel row must, therefore, be balanced within this frame duration, allowing sufficient time for the subsequent readout and reset phases for each row.

Conventionally, the integration time has been applied sequentially and uniformly to each pixel row to ensure identical exposure across the entire frame, considering the inherent nature of rolling shutters where each pixel row is exposed at slightly different times within the frame duration. Since the light conditions can change dynamically, especially during video capture, the camera system continuously recalibrates the integration time to ensure consistent exposure throughout the recording.

In typical scenarios, ambient light levels exhibit gradual shifts, spanning multiple imaging frames. This pace permits the sensor's Automatic Exposure Control (AEC) to modulate the integration time over several consecutive frames. Conventionally, image sensors ensure uniform integration time across all rows to prevent the introduction of undesirable visual distortions, such as alternating light and dark bands in the image. However, under unique but crucial conditions, there can be a pronounced and abrupt surge in illumination, often during the sensor's readout phase.

Figure 3:
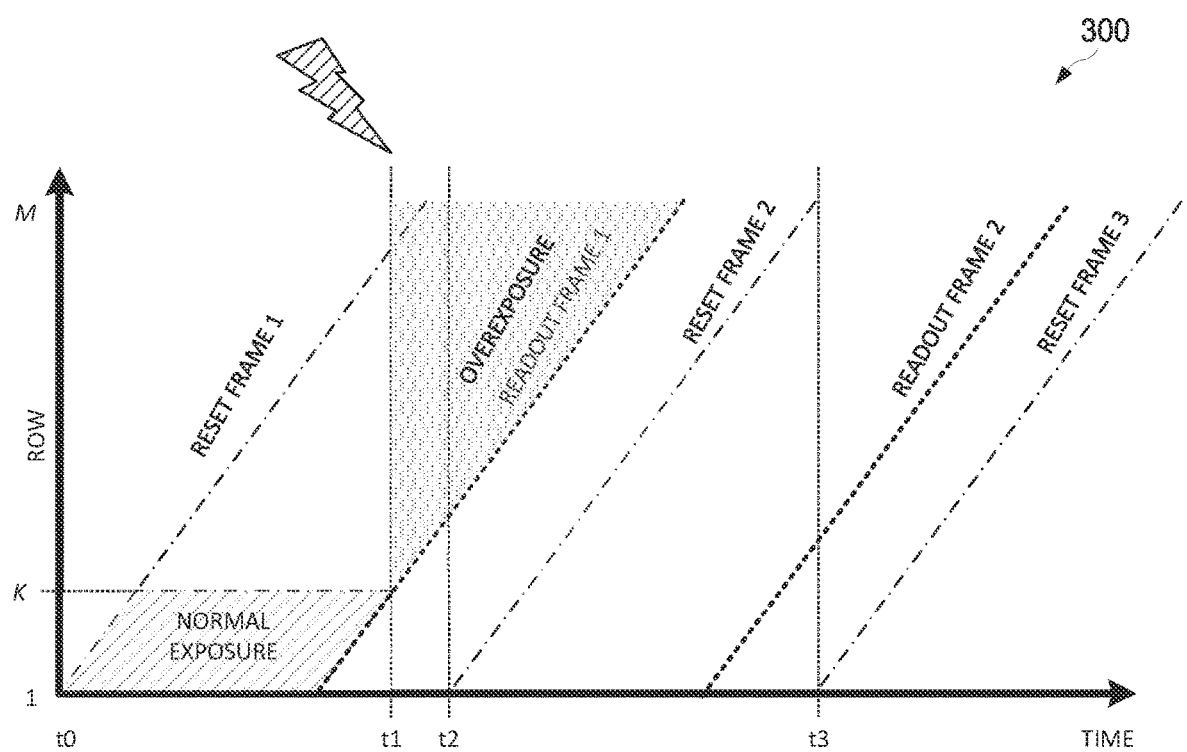
FIG. 3 is a timing diagram of an operation of a conventional imaging system incorporating a rolling shutter in response to an abrupt surge in light levels during the readout of the pixel rows.

FIG. 3 illustrates a timing diagram 300 of an operation of a conventional imaging system incorporating a rolling shutter in response to an abrupt surge in light levels during the readout of the pixel rows. If an abrupt change in light levels, such as a lightning flash or an explosion, occurs during the readout of a subset of the rows of a sensor operating on the rolling shutter principle, it can lead to discrepancies in exposure within the same frame.

As each pixel row is exposed and read out at different times sequentially, if an intense light event occurs during this process, the rows that have already been read out (i.e., rows 1 to K) before the event (<t1) will retain their pre-event exposure levels (i.e., normal exposure) and will appear properly exposed. These rows effectively capture the scene before the abrupt change in light and are unaffected by it as they have already concluded their exposure and readout phases.

Conversely, the rows in the middle of their exposure or yet to be exposed (i.e., rows K+1 to M) at the time (t1) of the sudden light change are impacted differently. These rows are subjected to abrupt and intense increases in light levels, and as a result, the pixels in these rows can become saturated due to overexposure. This saturation leads to a loss of detail in the affected areas of the frame, as the intense light overwhelms the sensor's ability to represent the scene accurately.

Traditionally, addressing abrupt shifts in light levels, such as transitioning from low to high light levels, involves initiating with roughly the maximum integration time, typically around one divided by the frame rate, and reducing the integration time gradually over multiple frames. Adjustments to integration time typically occur at the commencement of a frame sequence to avert the creation of image artifacts.

Our eyes can naturally adapt to varying light conditions, but pixels, with their relatively limited dynamic range compared to the human retina, necessitate manual adjustments to light levels. Cameras, especially in phones and video recorders, conventionally adjust to light levels gradually. This is because significant alterations to the system gain with only minimal changes in light can result in the image darkening, a scenario generally unfavorable. Many phones leverage pixel information to determine whether an image is over or underexposed, adjusting exposure based on the analysis of image statistics until a suitable level is achieved.

When pixels approach saturation, the system begins to reduce the gain, typically by modifying the exposure, and this is complemented by an analog gain present in the readout. However, this balanced adjustment can be disrupted when there is a sudden increase in light levels, leaving the camera, which is configured for low light, struggling with higher actual light levels, and resulting in image saturation.

In instances of saturation, the system, unable to determine the extent to which the light level should be reduced, incrementally decreases it until the saturation is resolved. However, this approach can often be too slow, particularly in security applications where rapid adjustments are crucial. Embodiments of this disclosure aim to prevent the undesirable effects of sudden light changes, working to maintain the integrity of the captured images in varying light conditions.

Figure 4:
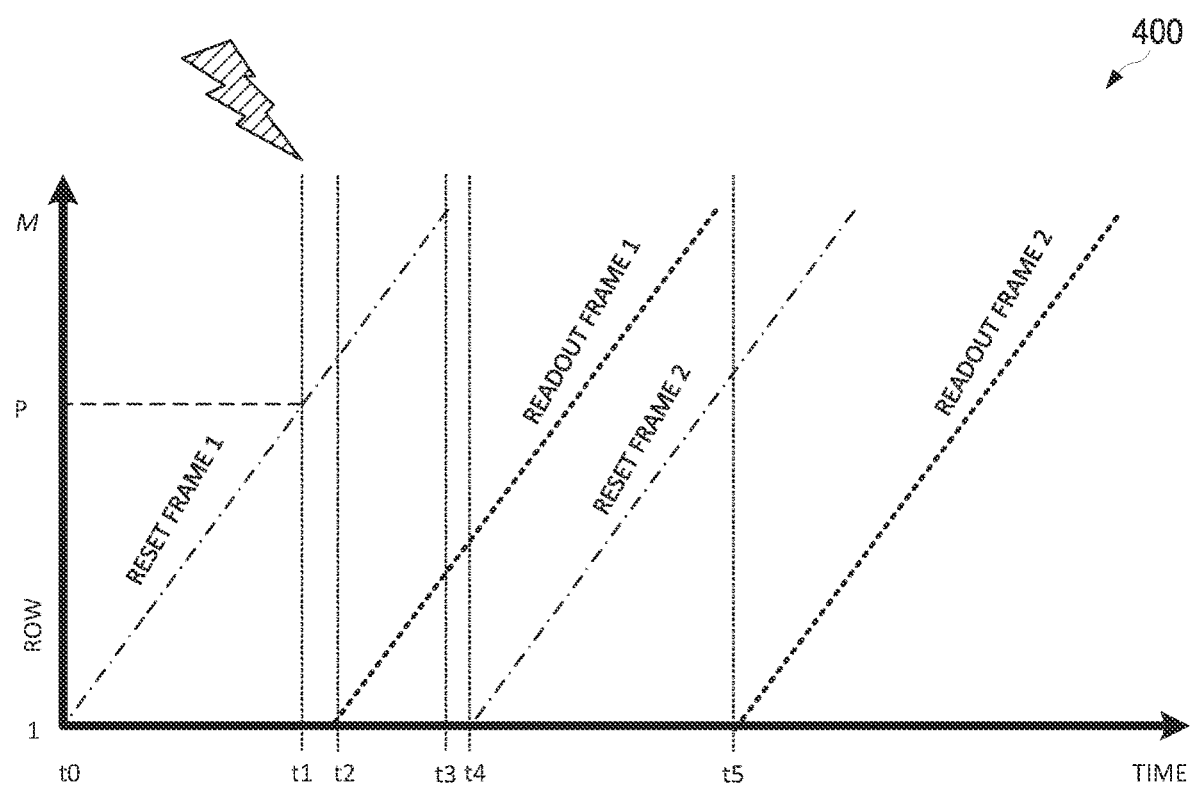
FIG. 4 is a timing diagram of an operation of the imaging system in response to an abrupt surge in light levels.

FIG. 4 illustrates a timing diagram 400 of an operation of the imaging system 100 in response to an abrupt surge in light levels. In FIG. 4, the abrupt surge in light level occurs at time t1 before the readout has begun at time t2 for the first pixel row. Imaging system 100 incorporates a rolling shutter process.

In embodiments, to capture the first frame (i.e., between time t0 and time t4), each pixel row of the pixel array 120 from the first pixel row to the last row (i.e., M-th row) of pixels is sequentially reset from time t0 to time t3. In embodiments, the first pixel row is reset at time t0 and the last pixel row (i.e., M-th row) is reset at time t3.

Once a respective pixel rows has been reset, the system waits until the completion of an integration time to readout the pixels for that respective row. In embodiments, in the absence of an abrupt surge in light levels during the capturing of the frame, each pixel row of the pixel array from the first pixel row to the last row is sequentially read out during a readout phase, such that the integration time for each pixel is equal.

Continuously, and asynchronously, with the reset, integration, and readout phases of the pixels 121, the light level of the surroundings is being measured using, for example, the ambient light sensor 102.

At time t1, in response to detecting an abrupt surge in light levels, a global reset of all pixels in pixel array 120 occurs. In embodiments, in response to determining that the ambient light level exceeds a threshold level, a global reset signal is generated. The global reset signal is simultaneously communicated to each pixel 121 of the pixel array 120, which results in an immediate reset of each pixel 121 of the pixel array 120.

In embodiments, the threshold level is a programmable threshold value. In embodiments, the threshold level or levels are provided as a selectable value to a user. In embodiments, the threshold level or levels are stored in the memory 108. In embodiments, the threshold level corresponds to a saturation of pixels of the image sensor 104. In embodiments, the threshold level or threshold levels correspond to various saturation levels of pixels 121.

In embodiments, the image processor 106 receives the ambient light levels from the S/H ADC 114 and compares the light level with a threshold level. In embodiments, the differentiating threshold ADC 116 generates a signal indicative of the detection of a photon surge. In embodiments, a global reset signal is generated in response to the signal generated by the differentiating threshold ADC 116.

As shown in FIG. 4, the global reset at time t1 occurs before the first pixel row has been read. As the global reset occurs before time t2, no pixels have been read out. Assuming that the global reset occurs during the reset of the P-th pixel rows, where P is less than M, the first subset of rows of pixels includes the first P pixel rows and the second subset of rows of pixels include the P+1 pixel rows up to the last pixel row.

Accordingly, the first subset of rows has a shorter integration time than the initial time interval. For example, the integration time for the first pixel row is from time t1 until time t2, where the first pixel row is read out. Each subsequent pixel row in the first subset of rows has a longer integration time than the first pixel row starting from time t1. Thus, although the pixel row in the first subset of rows have a shorter integration time and is partially exposed (e.g., under-exposed), the second subset of rows of pixels has an integration time equal to the initial time interval corresponding to a normal exposure time. In embodiments, the underexposure for the pixel rows in the first subset of rows can be digitally corrected using image processor 106 as a function of the output signal from each pixel (e.g., x, y coordinates) in the first subset of rows based on the exposure time (e.g., multiplied by (P−y)/P).

Figure 5:
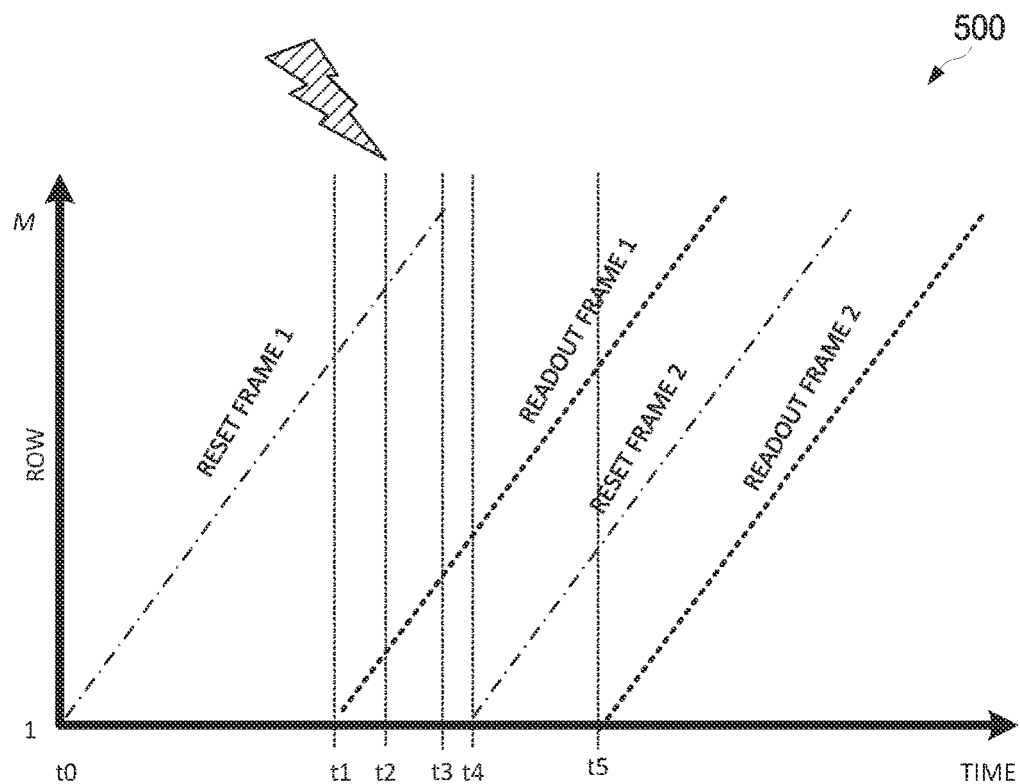
FIG. 5 is a timing diagram of an operation of the imaging system in response to an abrupt surge in light levels.

FIG. 5 illustrates a timing diagram 500 of an operation of the imaging system 100 in response to an abrupt surge in light levels. In FIG. 5, the abrupt surge in light level occurs at time t2 after the readout has begun at time t1 for the first pixel row but before the readout of the last row at time t5. Imaging system 100 incorporates a rolling shutter process.

In embodiments, to capture the first frame (i.e., between time t0 and time t4), each pixel row of the pixel array 120 from the first pixel row to the last row (i.e., M-th row) of pixels is sequentially reset from time t0 to time t3. In embodiments, the first pixel row is reset at time t0 and the last pixel row (i.e., M-th row) is reset at time t3.

Once a respective pixel rows has been reset, the system waits until the completion of an integration time to readout the pixels for that respective row. In embodiments, in the absence of an abrupt surge in light levels during the capturing of the frame, each pixel row of the pixel array from the first pixel row to the last row is sequentially read out during a readout phase, such that the integration time for each pixel is equal.

Continuously, and asynchronously, with the reset, integration, and readout phases of the pixels 121, the light level of the surroundings is being measured using, for example, the ambient light sensor 102.

At time t2, in response to detecting an abrupt surge in light levels, a global reset of all pixels in pixel array 120 occurs. In embodiments, in response to determining that the ambient light level exceeds a threshold level, a global reset signal is generated. The global reset signal is simultaneously communicated to each pixel 121 of the pixel array 120, which results in an immediate reset of each pixel 121 of the pixel array 120.

In embodiments, the threshold level is a programmable threshold value. In embodiments, the threshold level or levels are provided as a selectable value to a user. In embodiments, the threshold level or levels are stored in the memory 108. In embodiments, the threshold level corresponds to a saturation of pixels of the image sensor 104. In embodiments, the threshold level or threshold levels correspond to various saturation levels of pixels 121.

In embodiments, the photo-detector 111 converts light energy to an electrical signal, which is fed to the charge integrator 110. The charge integrator 110 integrates the charge over time (e.g., fixed) to create a voltage. Image processor 106 receives the ambient light levels from the S/H ADC 114 and compares the light level with a threshold level. In embodiments, the differentiating threshold ADC 116 generates a signal indicative of the detection of a photon surge. In embodiments, a global reset signal is generated in response to the signal generated by the differentiating threshold ADC 116.

As shown in FIG. 5, the global reset at time t2 occurs after the first pixel row has been read but before the last pixel row has been read. Thus, a first subset of rows of pixels has been read out before the global reset at time t2. In contrast, at time t2, a second subset of rows of pixels has not yet been read out. Assuming that the global reset occurs during the readout of the K-th pixel rows, where K is less than M, the first subset of rows of pixels includes the first K pixel rows and the second subset of rows of pixels include the K+1 pixel rows up to the last pixel row.

Each row of the first subset of rows of pixels that have already been read out before the global reset will retain its pre-event exposure levels corresponding to the second time interval and appear properly exposed. However, each row of the second subset of rows of pixels will have an integration time less than the original integration time of the first subset of rows of pixels. The first pixel row (i.e., K+1-th row) in the second subset of rows of pixels will have a zero second integration time. The next pixel rows in the second subset of rows of pixels will have a slightly greater integration time, but much less than the original integration time of the first subset of rows of pixels. The last pixel row in the second subset of rows of pixels (i.e., M-th row) will have an integration time equal to a third time interval equal to time t5−time t2.

In embodiments, time t2 is stored in the metadata for the image frame indicating the discontinuity in the processing of the rows of the first frame. In embodiments, the time t2, stored in the metadata, is used to post-process the rows of the second subset of pixel rows, which have a shorter integration time than the first subset of pixel rows.

In embodiments, to capture the second frame, the integration time is reduced from the original integration time in the first frame in response to the abrupt surge in light levels in the previous frame. In embodiments, the integration time for the second frame (and optionally for any subsequent frame) is set to the integration time for the last pixel row in the second subset of rows of pixels (i.e., M-th row), such that the integration time is equal to the third time interval (i.e., time t5−time t2). In embodiments, the integration time for the second frame (and optionally for subsequent frames) is set based on the light level detected using the ambient light sensor 102 from the S/H ADC 114.

Advantageously, embodiments of this disclosure increase the dynamic range of the image sensor 104 under asynchronous pulses of high light levels.

Figure 6:
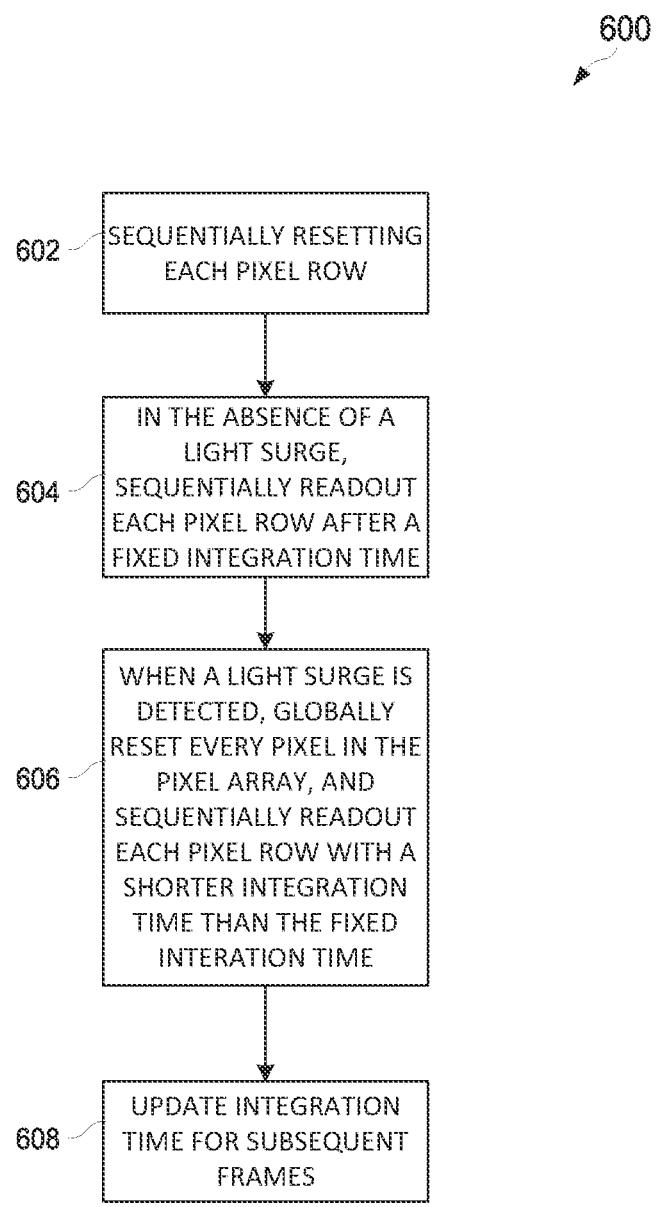
FIG. 6 is a flow chart of an embodiment method for capturing a frame using an imaging system in response to an abrupt surge in light levels.

FIG. 6 illustrates a flow chart of an embodiment method 600 for capturing a frame using an imaging system 100 in response to an abrupt surge in light levels. In FIG. 6, the abrupt surge in light level occurs before the readout has begun for the first pixel row.

At step 602, each pixel row of the pixel array 120 from a first pixel row to a last pixel row is sequentially rest.

At step 604, in the absence of an abrupt surge in light levels during the capturing of the frame, each pixel row of the pixel array 120 is readout during a readout phase such that an integration time for each pixel is equal to a fixed time interval. In embodiments, the integration time is set based on the ambient light levels detected by the ambient light sensor 102. In a video camera system, the maximum integration time for each frame is set to $$\frac{1}{\text{frame rate}}$$

to prevent a resetting of the pixels in the next frame before readout of the pixels in the current frame.

At step 606, in response to an abrupt surge in light levels before the capturing of the frame, all of the pixels 121 of the pixel array 120 are simultaneously and globally reset. In embodiments, the global reset occurs in response to determining that an ambient light level, detected by the ambient light sensor 102, exceeds a threshold level. In embodiments, the threshold level is a programmable threshold. In embodiments, the threshold level is selectable by a user from a set of values. In embodiments, the threshold level or levels are stored in the memory 108. In embodiments, the threshold level corresponds to a saturation of pixels of the image sensor 104. In embodiments, the threshold level or threshold levels correspond to various saturation levels of pixels 121.

At step 606, the set of pixel rows previously reset before the global reset is included in a first subset of pixel rows. The set of pixel rows not yet reset at the time of the global reset is included in a second subset of pixel rows. Each pixel row in the second subset of pixel rows from an interval pixel row to the last pixel row has a consistent and fixed integration time. Each pixel row in the first subset of pixel rows from the first pixel row to the interval pixel row has an integration time less than the integration time of the pixels in the second pixel row and variable in value. The integration time for each pixel in the first subset of pixel rows corresponds to an integration time that starts from the global reset.

At step 608, the integration time for the subsequent frame is determined. In embodiments, the integration time is reduced from the original integration time in the first frame in response to the abrupt surge in light levels in the previous frame. In embodiments, the integration time for the subsequent frame or frames is set to the integration time for the last pixel row in the second subset of rows of pixels (i.e., M-th row) of the first frame. In embodiments, the integration time for subsequent frames or frames is set based on the light level detected using the ambient light sensor 102 from the S/H ADC 114.

Figure 7:
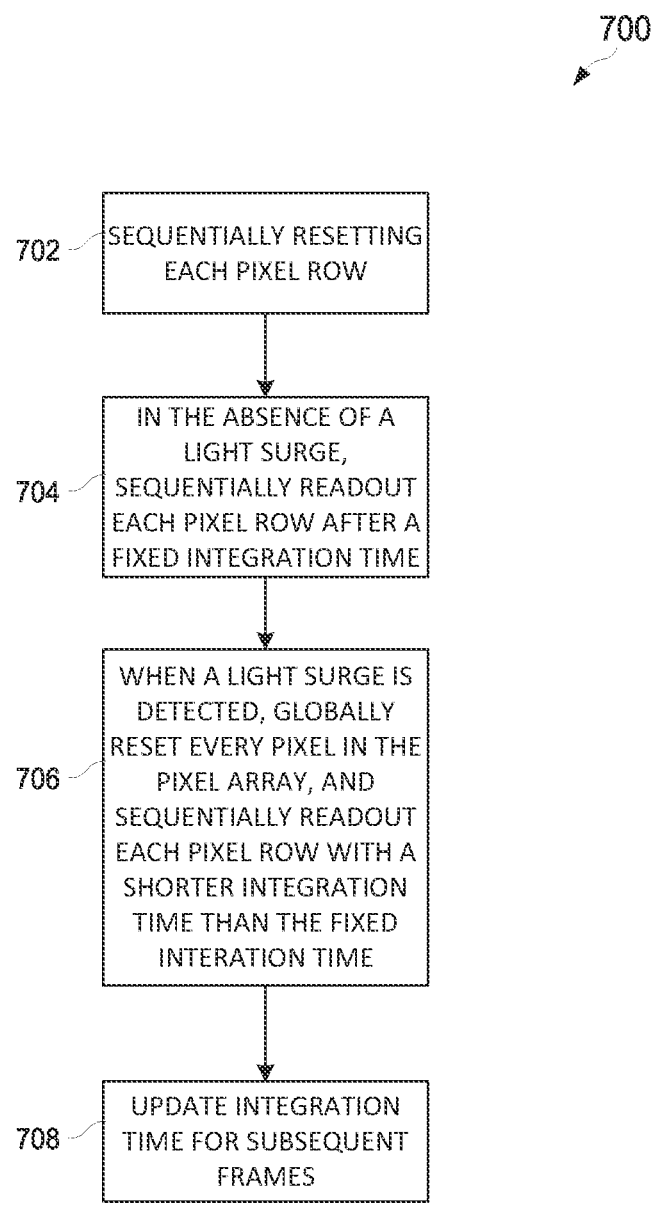
FIG. 7 is a flow chart of an embodiment method for capturing a frame using an imaging system in response to an abrupt surge in light levels.

FIG. 7 illustrates a flow chart of an embodiment method 700 for capturing a frame using an imaging system 100 in response to an abrupt surge in light levels. In FIG. 7, the abrupt surge in light level occurs after the readout has begun for the first pixel row but before the readout of the last row.

At step 702, each pixel row of the pixel array 120 from a first pixel row to a last pixel row is sequentially reset.

At step 704, in the absence of an abrupt surge in light levels during the capturing of the frame, each pixel row of the pixel array 120 is readout during a readout phase such that an integration time for each pixel is equal to a fixed time interval. In embodiments, the integration time is set based on the ambient light levels detected by the ambient light sensor 102. In a video camera system, the maximum integration time for each frame is set to $$\frac{1}{\text{frame rate}}$$

to prevent a resetting of the pixels in the next frame before readout of the pixels in the current frame.

At step 706, in response to an abrupt surge in light levels during the capturing of the frame, all of the pixels 121 of the pixel array 120 are simultaneously and globally reset. In embodiments, the global reset occurs in response to determining that an ambient light level, detected by the ambient light sensor 102, exceeds a threshold level. In embodiments, the threshold level is a programmable threshold. In embodiments, the threshold level is selectable by a user from a set of values. In embodiments, the threshold level or levels are stored in the memory 108. In embodiments, the threshold level corresponds to a saturation of pixels of the image sensor 104. In embodiments, the threshold level or threshold levels correspond to various saturation levels of pixels 121.

At step 706, the set of pixel rows already read before the global reset is included in a first subset of pixel rows. The set of pixel rows not yet read at the time of the global reset is included in a second subset of pixel rows. Each pixel row in the first subset of pixel rows from the first pixel row to an interval pixel rows has a consistent and fixed integration time. Each pixel row in the second subset of pixel rows from the interval pixel rows to the last pixel row has an integration time less than the integration time of the pixels in the first pixel row and variable in value. The integration time for each pixel in the second subset of pixel rows corresponds to an integration time that starts from the global reset.

At step 708, the integration time for the subsequent frame is determined. In embodiments, the integration time is reduced from the original integration time in the first frame in response to the abrupt surge in light levels in the previous frame. In embodiments, the integration time for the subsequent frame or frames is set to the integration time for the last pixel row in the second subset of rows of pixels (i.e., M-th row) of the first frame. In embodiments, the integration time for subsequent frames or frames is set based on the light level detected using the ambient light sensor 102 from the S/H ADC 114.

It is noted that all steps outlined in the flow charts of the methods are not necessarily required and can be optional. Further, changes to the arrangement of the steps, removal of one or more steps and path connections, and addition of steps and path connections are similarly contemplated.

A first aspect relates to a method for capturing an image frame using a pixel array of an image sensor. The method includes sequentially resetting each pixel row of the pixel array from a first pixel row to a last pixel row; sequentially reading out each pixel row of a first subset of pixel rows during a readout phase such that an integration time for each pixel of the first subset of pixel rows is equal to a fixed integration time; and globally resetting pixels of the pixel array in response to detecting that an ambient light level exceeds a threshold level, the globally resetting of the pixels occurring before a reading out of a second subset of pixel rows, each pixel row in the second subset of pixel rows having a variable integration time less than the fixed integration time and starting from the globally resetting of the pixels.

In a first implementation of the method according to the first aspect as such, the method further includes determining, by an ambient light sensor that the ambient light level exceeds the threshold level and, in response, generating a signal indicating a photon surge event.

In a second implementation form of the method according to the first aspect as such or any preceding implementation form of the first aspect, the threshold level is a programmable threshold.

In a third implementation form of the method according to the first aspect as such or any preceding implementation form of the first aspect, the determining that the ambient light level exceeds the threshold level corresponds to a saturation of pixels of the image sensor.

In a fourth implementation form of the method according to the first aspect as such or any preceding implementation form of the first aspect, the method further includes storing a time of discontinuity in metadata for the image frame corresponding to the detection of the ambient light level.

In a fifth implementation form of the method according to the first aspect as such or any preceding implementation form of the first aspect, the method further includes post-processing the second subset of pixel based on the time of discontinuity stored in the metadata.

In a sixth implementation form of the method according to the first aspect as such or any preceding implementation form of the first aspect, the image frame is a first image frame, the method further includes sequentially resetting each pixel row of the pixel array from a first pixel row to a last pixel row; and sequentially reading out each pixel row from the first pixel row to the last pixel row during a second readout phase such that an integration time for each pixel is equal to a second fixed integration time.

In a seventh implementation form of the method according to the first aspect as such or any preceding implementation form of the first aspect, the second fixed integration time is equal to an integration time of the last pixel row for the first image frame or based on the ambient light level of the first image frame.

In an eight implementation form of the method according to the first aspect as such or any preceding implementation form of the first aspect, the second fixed integration time is shorter in duration than the fixed integration time of the first image frame.

In a ninth implementation form of the method according to the first aspect as such or any preceding implementation form of the first aspect, the globally resetting the pixels is asynchronous in operation with respect to the sequential reading of the pixels.

A second aspect relates to an imaging system. The imaging system includes a pixel array; a non-transitory memory storage comprising instructions; and a processor in communication with the non-transitory memory storage and the pixel array. The processor is configured to execute the instructions to sequentially reset each pixel row of the pixel array from a first pixel row to a last pixel row; sequentially read out each pixel row of a first subset of pixel rows during a readout phase such that an integration time for each pixel of the first subset of pixel rows is equal to a fixed integration time; and globally reset pixels of the pixel array in response to detecting that an ambient light level exceeds a threshold level, the globally resetting of the pixels occurring before a reading out of a second subset of pixel rows, each pixel row in the second subset of pixel rows having a variable integration time less than the fixed integration time and starting from the globally resetting of the pixels.

In a first implementation of the imaging system according to the second aspect as such, the imaging system further includes an ambient light sensor configured to determine that the ambient light level exceeds the threshold level and, in response, generate a signal indicating a photon surge event.

In a second implementation form of the imaging system according to the second aspect as such or any preceding implementation form of the second aspect, the threshold level is a programmable threshold.

In a third implementation form of the imaging system according to the second aspect as such or any preceding implementation form of the second aspect, the processor is configured to execute the instructions to store a time of discontinuity in metadata corresponding to the detection of the ambient light level.

In a fourth implementation form of the imaging system according to the second aspect as such or any preceding implementation form of the second aspect, an integration time to capture a subsequent frame is set equal to an integration time of the last pixel row or based on the ambient light level determined during the readout phase.

A third aspect relates to a computer-implemented method for capturing an image frame using a pixel array of an image sensor. The computer-implemented method includes sequentially resetting each pixel row of the pixel array from a first pixel row to a last pixel row; sequentially reading out each pixel row of a first subset of pixel rows during a readout phase such that an integration time for each pixel of the first subset of pixel rows is equal to a fixed integration time; and globally resetting pixels of the pixel array in response to detecting that an ambient light level exceeds a threshold level, the globally resetting of the pixels occurring before a reading out of a second subset of pixel rows, each pixel row in the second subset of pixel rows having a variable integration time less than the fixed integration time and starting from the globally resetting of the pixels.

In a first implementation of the computer-implemented method according to the third aspect as such, the method further includes determining, by an ambient light sensor, that the ambient light level exceeds the threshold level and, in response, generating a signal indicating a photon surge event.

In a second implementation form of the computer-implemented method according to the third aspect as such or any preceding implementation form of the third aspect, the threshold level is a programmable threshold.

In a third implementation form of the computer-implemented method according to the third aspect as such or any preceding implementation form of the third aspect, the computer-implemented method further includes storing a time of discontinuity in metadata for the image frame corresponding to the detection of the ambient light level.

In a fourth implementation form of the computer-implemented method according to the third aspect as such or any preceding implementation form of the third aspect, the image frame is a first image frame, and an integration time for a subsequent frame is set equal to an integration time of the last pixel row for the first image frame or based on the ambient light level of the first image frame.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for capturing an image frame using a pixel array of an image sensor, the method comprising:
    sequentially resetting each pixel row of the pixel array from a first pixel row to a last pixel row;
    sequentially reading out each pixel row of a first subset of pixel rows during a readout phase, such that an integration time for each pixel of the first subset of pixel rows is equal to a fixed integration time; and
    globally resetting pixels of the pixel array in response to detecting that an ambient light level exceeds a threshold level, the globally resetting of the pixels occurring before a reading out of a second subset of pixel rows, each pixel row in the second subset of pixel rows having a variable integration time less than the fixed integration time and starting from the globally resetting of the pixels.

2. The method of claim 1, further comprising determining, by an ambient light sensor, that the ambient light level exceeds the threshold level and, in response, generating a signal indicating a photon surge event.

3. The method of claim 1, wherein the threshold level is a programmable threshold.

4. The method of claim 1, wherein determining that the ambient light level exceeds the threshold level corresponds to a saturation of pixels of the image sensor.

5. The method of claim 1, further comprising storing a time of discontinuity in metadata for the image frame corresponding to the detection of the ambient light level.

6. The method of claim 5, further comprising postprocessing the second subset of pixel rows based on the time of discontinuity stored in the metadata.

7. The method of claim 1, wherein the image frame is a first image frame, the method further comprising:
    sequentially resetting each pixel row of the pixel array from a first pixel row to a last pixel row; and sequentially reading out each pixel row from the first pixel row to the last pixel row during a second readout phase, such that an integration time for each pixel is equal to a second fixed integration time.

8. The method of claim 7, wherein the second fixed integration time is equal to an integration time of the last pixel row for the first image frame or based on the ambient light level of the first image frame.

9. The method of claim 7, wherein the second fixed integration time is shorter in duration than the fixed integration time of the first image frame.

10. The method of claim 1, wherein globally resetting the pixels is asynchronous in operation with respect to the sequential reading of the pixels.

11. An imaging system, comprising:
a pixel array;
a non-transitory memory storage comprising instructions; and
a processor in communication with the non-transitory memory storage and the pixel array, the processor configured to execute the instructions to:
sequentially reset each pixel row of the pixel array from a first pixel row to a last pixel row;
sequentially read out each pixel row of a first subset of pixel rows during a readout phase, such that an integration time for each pixel of the first subset of pixel rows is equal to a fixed integration time; and
globally reset pixels of the pixel array in response to detecting that an ambient light level exceeds a threshold level, the globally resetting of the pixels occurring before a reading out of a second subset of pixel rows, each pixel row in the second subset of pixel rows having a variable integration time less than the fixed integration time and starting from the globally resetting of the pixels.

12. The imaging system of claim 11, further comprising an ambient light sensor configured to determine that the ambient light level exceeds the threshold level and, in response, generate a signal indicating a photon surge event.

13. The imaging system of claim 11, wherein the threshold level is a programmable threshold.

14. The imaging system of claim 11, wherein the processor is configured to execute the instructions to store a time of discontinuity in metadata corresponding to the detection of the ambient light level.

15. The imaging system of claim 11, wherein an integration time to capture a subsequent frame is set equal to an integration time of the last pixel row or based on the ambient light level determined during the readout phase.

16. A computer-implemented method for capturing an image frame using a pixel array of an image sensor, the computer-implemented method comprising:
sequentially resetting each pixel row of the pixel array from a first pixel row to a last pixel row;
sequentially reading out each pixel row of a first subset of pixel rows during a readout phase, such that an integration time for each pixel of the first subset of pixel rows is equal to a fixed integration time; and
globally resetting pixels of the pixel array in response to detecting that an ambient light level exceeds a threshold level, the globally resetting of the pixels occurring before a reading out of a second subset of pixel rows, each pixel row in the second subset of pixel rows having a variable integration time less than the fixed integration time and starting from the globally resetting of the pixels.

17. The computer-implemented method of claim 16, further comprising determining, by an ambient light sensor, that the ambient light level exceeds the threshold level and, in response, generating a signal indicating a photon surge event.

18. The computer-implemented method of claim 16, wherein the threshold level is a programmable threshold.

19. The computer-implemented method of claim 16, further comprising storing a time of discontinuity in metadata for the image frame corresponding to the detection of the ambient light level.

20. The computer-implemented method of claim 16, wherein the image frame is a first image frame, and wherein an integration time for a subsequent frame is set equal to an integration time of the last pixel row for the first image frame or based on the ambient light level of the first image frame.

* * * * *